United States Patent [19]

Dillinger et al.

[11] Patent Number: 5,387,562
[45] Date of Patent: Feb. 7, 1995

[54] SILICON SLIP-CASTING COMPOSITION, AND PROCESS FOR THE PREPARATION THEREOF

[75] Inventors: Reinhard Dillinger; Jürgen Heinrich, both of Selb, Germany

[73] Assignee: Hoechst CeramTec Aktiengesellschaft, Selb, Germany

[21] Appl. No.: 935,196

[22] Filed: Aug. 26, 1992

[30] Foreign Application Priority Data

Aug. 28, 1991 [DE] Germany .............................. 4128496

[51] Int. Cl.$^6$ .............................................. C04B 35/58
[52] U.S. Cl. .......................................... 501/97; 501/98
[58] Field of Search ................... 264/86; 501/154, 97, 501/98; 419/40

[56] References Cited

U.S. PATENT DOCUMENTS

| | | | |
|---|---|---|---|
| 4,471,060 | 9/1984 | Dickie et al. | 501/151 |
| 4,482,388 | 11/1984 | Crosbie | 106/287.1 |
| 4,562,041 | 12/1985 | Mangles et al. | 419/40 |
| 5,055,432 | 10/1991 | Edler et al. | 501/57 |
| 5,166,106 | 11/1992 | Edler et al. | 501/98 |
| 5,213,729 | 5/1993 | Edler et al. | 264/63 |

OTHER PUBLICATIONS

Dillinger et al., "Slip-Cast Hot Isostatically Pressed Silicon Nitride Gas Turbine Components", Materials Science And Engineering, Bd. A109, 1988, pp. 373-378 no month.

Primary Examiner—Mark L. Bell
Assistant Examiner—A. Wright
Attorney, Agent, or Firm—Foley & Lardner

[57] ABSTRACT

Silicon slip-casting composition, and process for the preparation thereof

A silicon slip-casting composition comprising from 25 to 50% by weight of water and a pulverulent solid component which essentially comprises silicon and inorganic sintering aids is described, where the aqueous phase has a pH in the range from 8 to 9.5. The solid component comprises from 65 to 88% by weight of silicon, from 5 to 24% by weight of $Y_2O_3$, from 2 to 9.6% by weight of $Al_2O_3$ and from 1 to 5% by weight of $SiO_2$ on the surface of the Si particles.

The mean particle size of the solid component is at most 20 $\mu$m, in particular at most 5 $\mu$m. The invention also relates to a process for the preparation of the slip-casting composition.

17 Claims, No Drawings

SILICON SLIP-CASTING COMPOSITION, AND PROCESS FOR THE PREPARATION THEREOF

FIELD OF THE INVENTION AND DESCRIPTION OF RELATED ART

The invention relates to an aqueous slip-casting composition which contains inorganic sintering aids, a dissolved silicate and a high proportion of silicon dioxide on the individual silicon particles.

Silicon nitride, $Si_3N_4$, is, due to its excellent properties —high mechanical strength, hardness, and corrosion, oxidation and thermal shock resistance—an important material for numerous applications in machine construction.

In the production of components made from $Si_3N_4$ ceramics, a distinction can be made in principle between two methods: the production of compacts from $Si_3N_4$ powder with sintering additives and subsequent sintering, and the production of compacts from pulverulent elemental silicon with sintering additives, subsequent nitridation to give RBSN (reaction bonded silicon nitride) and a subsequent hot isostatic recompaction. The present invention relates to the RBSN method.

The shaping processes employed hitherto for the production of compacts from silicon powder were, in particular, isostatic pressing and injection molding, while the process of slip-casting, which is very widespread in conventional ceramics, was hardly used at all. In this technique, a solid/liquid dispersion is poured into a porous mold material, usually plaster. The porous mold adsorbs the liquid phase from the suspension, leaving a solid green body of sufficient strength for further processing. The advantages of slip-casting compared with other methods are obvious: components with a relatively complex shape can be cast using inexpensive plaster molds which are easy to produce, in many cases water can be used as the dispersion medium, and homogeneous castings of high green density can be produced.

Slip-casting as a shaping method for elemental silicon is already known.

Ezis et al., Am. Ceram. Soc. Bull. 62 (1983), p. 607, studied the parameters and behavior of silicon slips. They too proposed an aging process for the silicon powder in order to achieve a gas-free slip. In the pH range from 6.5 to 9, slips of low viscosity and high green density were achieved. An alkaline deflocculant was employed; the desired pH was produced by means of nitric acid or ammonia.

I. Y. Guzmann et al., Refractories 10 (1976), p. 56, found that silicon slips have a steep viscosity minimum at a pH of 5 and a broad viscosity minimum in the range from 9 to 10. The greatest densities were observed in the alkaline region. Ammonia was used to adjust the pH, and a polyvinyl alcohol was used as a deflocculant.

However, the aqueous slips employed contained as solid phase only silicon powder and no inorganic sintering aid elements. It was therefore only possible to produce from them components of RBSN which cannot be recompacted and, due to their residual porosity of from about 20 to 30%, have relatively low strength (maximum flexural fracture strength 250 MPa).

In order to produce high-strength silicon nitride-based ceramics, hot isostatic recompaction of the components must be carried out in order to eliminate the residual porosity. This process requires the addition of sintering aids, generally mixtures of rare earth oxides and aluminum or magnesium oxide. Powders of these sintering additives are therefore admixed with the silicon before nitridation. The difficulties occurring on dispersion of a mixture of silicon powder and the pulverulent sintering aids yttrium oxide and aluminum oxide in water have already been described in a number of publications, for example in Angew. Chem. Adv. Mater. 101 (1989) p. 1592:

- At a pH>8, hydrolysis occurs in the case of unpretreated powders, with a considerable increase in gas evolution with increasing pH.
- The surface charge of the silicon particles in aqueous solution is negative at a pH>2, whereas the surface charge of untreated $Al_2O_3$ powders is positive up to a pH of about 8 (isoelectric point in both cases between pH 8 and 9), i.e. considerable flocculation occurs at a pH<8.
- The solubility of $Y_2O_3$ increases as the pH drops. At a pH<8, the concentration of $Y^{3+}$ ions is sufficient to cause considerable flocculation of the suspension.
- Both the silicon powder and the powders of the sintering additives affect the pH of the suspension due to surface reactions (at a pH>10, consumption of hydroxyl ions takes place in the case of all said powders).

In particular, it is known from Mat. Science and Engn. A (1988), p. 373, to use silicon slip-casting compositions containing water, the remainder silicon, aluminum oxide and $Y_2O_3$ in powder form and an organic dispersant (=polyanion) and a water-soluble silicate. It is stated that slips having a particularly low viscosity in the pH range >7.5 are obtainable. According to this reference, commercially available silicon powders have from 1.5 to 2% by weight of $SiO_2$ on the surface.

This process has the disadvantage that finely divided silicon is attacked by alkalis with evolution of hydrogen, and the dispersions employed are only stable for a short time.

SUMMARY OF THE INVENTION

An aqueous silicon slip-casting composition has now been found which, in addition to silicon, $Y_2O_3$ and aluminum oxide solid components, may additionally contain, in dissolved form, from 0.2 to 1% by weight of an organic dispersant and silicate, and whose essential features are that it contains from 25 to 50% by volume of water, and the solid component comprises from 65 to 88% by weight of silicon, from 5 to 24% by weight of $Y_2O_3$, from 2 to 9.6% by weight of $Al_2O_3$ and from 1 to 5% by weight of $SiO_2$ on the surface of the silicon particles, in each case based on the sum of 100% by weight of the solid component, and has a pH from 8 to 9.5. The mean particle size of the solid component is at most 20 $\mu$m and in particular at most 5 $\mu$m.

The $Y_2O_3$ and aluminum oxide components act as sintering aids and enable hot isostatic recompaction of components in order to eliminate the residual porosity. In the stated pH range of from 8 to 9.5, aqueous dispersions of silicon, in particular if this has been surface-oxidized, have satisfactory stability.

DETAILED DESCRIPTION OF THE PREFERRED EMBODIMENTS

R. Dillinger et al., Mat. Science and Engineering A 109 (1988), page 373, discloses similar silicon slip-casting compositions having a pH of from 7.5 to 9.0 and containing $Y_2O_3$ and aluminum oxide. The silicon powder employed has an $SiO_2$ content of from about 1.5 to 2%. However, precise details on the amounts of the individual constituents are lacking.

The invention furthermore relates to the preparation of a ceramic slip-casting composition having the stated composition. The preparation is based on the observation that silicon powders can be oxidized on the surface of the particles in the presence of oxygen, and passivation is thus achieved.

In a process for the preparation of the slip-casting composition, a mixture of from 66 to 93 parts by weight of pulverulent silicon, from 5 to 24 parts by weight of $Y_2O_3$ and from 2 to 9.6 parts by weight of $Al_2O_3$ is ground until a mean particle size of at most 20 $\mu$m, preferably 5 $\mu$m, has been reached, the ground powder mixture is then heated in air at a temperature of from 200° to 300° C. for at least 12 hours, an aqueous solution having a pH between 11 and 13 is prepared in parallel, the ground powder mixture is then stirred into this aqueous solution, and the batch is subsequently freed from air by evacuation.

The silicon powder must not be ground in water since the fresh surfaces produced would rapidly hydrolyze. Wet-grinding in a non-aqueous solvent, for example isopropanol, is possible. Grinding in a ball mill with addition of aluminum oxide beads has proven successful. In this wet-grinding of the silicon/$Y_2O_3$/$Al_2O_3$ powder mixture, grinding times of between 12 hours and 48 hours are sufficient. The dispersion medium (isopropanol) is subsequently removed.

Dry grinding of said powder mixture, for example in a ball mill, is also possible. Here, proportions of 0.1% of isopropanol as antiagglomerant have proven successful. Grinding times of between 12 hours and 48 hours are again sufficient here. The grinding achieves on the one hand homogenization of the solid components, and on the other hand the primary particles of the starting powder are comminuted. Experiments have shown that increasing the pregrinding time results in increasing component strength of hot isostatically recompacted components.

By heating the ground powder mixtures, all of the liquid dispersion medium (in the case of wet grinding) is removed. This is advantageous for good resistance of the prepared dispersions. Furthermore, the thermal treatment oxidizes the silicon starting powder at the surface of the particles, thus increasing its oxygen content. It has also been found that the pH from which hydrolysis of the silicon becomes noticeable under alkaline conditions is dependent on the oxygen content of the powder and thus on the thickness of the $SiO_2$ surface layer on the Si powder particles. Whereas untreated silicon powder forms hydrogen with water from a pH of only 7, the thermally treated powder according to the invention is, surprisingly, stable to hydrolysis up to a pH of 10.

The adjustment of the pH of the aqueous solution to from 11 to 13 is effected with the aid of a base. Bases which can be used are, for example, organic bases, sodium carbonate or alkali metal hydroxide. Preference is given to soluble silicates. The base should be added in such an amount that the pH does not fall below 8.0 even after combination with the silicon powder. It is furthermore advantageous for this starting solution to contain a dispersant, in particular based on an organic polymer. Examples of dispersants which can be used are alkylsulfonates, alkylbenzenesulfonates, products of the condensation of fatty acids with amino-containing compounds, phosphoric acid esters of fatty alcohols or polyacrylates.

After the silicon powder (including inorganic dopes) has been stirred into the aqueous solution, the pH drops rapidly to from 8.0 to 9.5. Aqueous solutions containing from 0.2 to 1% by weight of an organic dispersant plus silicate have proven successful. The stirring time is preferably at least 12 hours.

In order to remove the coarse agglomerates produced (at the slip surface at the vessel edge of drying slips) during mixing of the dispersion, it is advantageous to sieve the slip. Sieves having a maximum mesh width of 200 $\mu$m have proven successful.

During mixing of the batch and during sieving, air can enter the slip. Included air bubbles can considerably impair the quality of the finished component. In order to remove air bubbles from the slip, it can be evacuated, ideally immediately after casting.

In a further process for the production of the casting composition, grinding is carried out in the absence of the inorganic dopes. In this process, pulverulent silicon is ground until a mean particle size of at most 20 $\mu$m, in particular at most 5 $\mu$m, has been reached, the ground silicon is heated in air at a temperature of from 200° to 300° C. for at least 12 hours, $Y_2O_3$ and $Al_2O_3$ are added to the silicon (if necessary after cooling) until a mixture is formed which comprises from 66 to 93% by weight of silicon oxidized at the surface of the particles, from 5 to 24% by weight of $Y_2O_3$ and from 2 to 9.6% by weight of $Al_2O_3$, an aqueous solution is prepared which has a pH of between 12 and 13, the ground silicon powder and inorganic dopes are stirred into the aqueous solution, and the batch is subsequently evacuated.

In another embodiment of the process according to the invention, the grinding operation described is carried out in the presence of the sintering aids. Thus, a mixture comprising 66–93% by weight of pulverulent silicon, 5–24% by weight of $Y_2O_3$ and from 2 to 9.6% by weight of $Al_2O_3$ is first prepared, the mixture is ground until a particle size of at most 20 $\mu$m, in particular at most 5 $\mu$m, has been reached, and the mixture is heated in air at a temperature of from 200° to 300° C. for at least 12 hours in order to oxidize the silicon at the surface of the particles. The batch is subsequently ground in a ball mill with an aqueous alkaline solution of pH 11–12 with addition of $Al_2O_3$ beads.

In a further embodiment of the process according to the invention, commercially available silicon powder (particle size at most 30 $\mu$m) is first heated in air at a temperature of 200°–300° C. for at least 12 hours without grinding. The powder is then mixed with $Y_2O_3$ and $Al_2O_3$, giving a mixture which comprises 60–93% by weight of silicon oxidized at the surface of the particles, 5–24% by weight of $Y_2O_3$ and from 2 to 9.6% by weight of $Al_2O_3$. This mixture is ground in a ball mill with an aqueous alkaline solution of pH 11–12 with addition of $Al_2O_3$ beads.

In this way, the desired final pH is established more quickly and deagglomeration of the powder mixture is at the same time very good. In this process, the slip is ready for processing after a grinding time of 2.5 hours. In order to avoid destruction of the thermally produced passivation layer, this grinding must be carried out at low speed. A grinding time significantly in excess of 2.5 hours can also result in destruction of the passivation layer.

The finished slip can be poured into a plaster mold in order to produce a casting. It is advantageous to treat the plaster mold used for a short time, for example for from 5 to 60 seconds, with an approximately 0.5% strength aqueous solution of ammonium alginate. This somewhat reduces the body formation rate, improves the surface quality of the castings, prevents penetration of fines of the powder into the plaster mold, and suppresses corrosive roughening of the plaster mold.

The residence time of the slip composition in the plaster mold for formation of a body of sufficient wall thickness is between 10 minutes and 45 minutes, depending on the desired wall thickness. Excess slip is then removed. The finished green body can be demolded after at most 2 hours. The green bodies produced can be further processed by nitridation and subsequent hot isostatic recompaction to give silicon nitride articles of excellent strength.

We claim:

1. A silicon-containing slip-casting composition comprising from 25 to 50% by weight of an aqueous phase and a pulverulent solid component which comprises silicon and inorganic sintering aids, where the aqueous phase has a pH in the range from 8 to 9.5, wherein the solid component comprises from 65 to 88% by weight of silicon, from 5 to 24% by weight of $Y_2O_3$, from 2 to 9.6% by weight $Al_2O_3$ and from 1 to 5% by weight $SiO_2$ on the surface of the Si particles, and wherein the mean particle size of the solid component is at most 5 $\mu$m.

2. A slip-casting composition as claimed in claim 1, which additionally contains a dissolved silicate.

3. A slip-casting composition as claimed in claim 1, which additionally contains an organic dispersant in dissolved form.

4. A slip-casting composition as claimed in claim 3, which contains from 0.2 to 1% by weight of organic dispersant plus silicate.

5. A process for the preparation of a silicon-containing slip-casting composition as claimed in claim 1, comprising the steps of
   (a) grinding a mixture of from 66 to 93 parts by weight of pulverulent silicon, from 5 to 24 parts by weight of $Y_2O_3$ and from 2 to 9.6 parts by weight of $Al_2O_3$ until a mean particle size of at most 5 $\mu$m, has been reached;
   (b) heating the ground powder mixture of step (a) in air at a temperature of from 200° to 300° C. for at least 12 hours;
   (c) preparing an aqueous solution which has a pH of between 11 and 13;
   (d) stirring the ground powder mixture into the aqueous solution to form a batch; and
   (e) subsequently evacuating the batch.

6. The process as claimed in claim 5, wherein the pH is adjusted to between 11 and 13 by addition of a soluble silicate.

7. The process as claimed in claim 6, wherein the aqueous solution of pH 11 to 13 additionally contains a polymeric organic dispersant.

8. The process as claimed in claim 5, wherein the proportion of soluble silicate plus soluble dispersant is adjusted to from 0.2 to 1% by weight.

9. The process as claimed in claim 5, wherein the pulverulent mixture is dry-ground.

10. The process as claimed in claim 5, wherein the pulverulent mixture is ground in a nonaqueous solvent, and the solvent is then removed.

11. A process for the preparation of a silicon-containing slip-casting composition as claimed in claim 1, comprising the steps of
    (a) grinding a pulverulent silicon until a mean particle size of at most 5 $\mu$m, has been reached;
    (b) heating the ground powder of step (a) in air at a temperature of from 200° to 300° C. for at least 12 hours;
    (c) adding $Y_2O_3$ and $Al_2O_3$ to the ground powder, until a mixture is formed which comprises from 66 to 93% by weight of silicon oxidized at the surface of the particles, from 5 to 24% by weight of $Y_2O_3$ and from 2 to 9.6% by weight of $Al_2O_3$;
    (d) preparing an aqueous solution which has a pH of between 11 and 13;
    (e) stirring the ground silicon powder and inorganic dopes into the aqueous solution to form a batch; and
    (f) subsequently evacuating the batch.

12. The process as claimed in claim 11 wherein $Y_2O_3$ and $Al_2O_3$ are added in step (c) after cooling.

13. The process as claimed in claim 6, wherein the soluble silicate is an alkali metal silicate.

14. The process as claimed in claim 5, wherein the grinding step (a) is carried out in the presence of sintering aids.

15. The process as claimed in claim 11, wherein the grinding step (a) is carried out in the presence of sintering aids.

16. A process for the preparation of a silicon-containing slip-casting composition as claimed in claim 1, comprising the steps of
    (a) heating a silicon powder having a particle size of at most 30 $\mu$m in air at a temperature of 200°–300° C. for at least 12 hours without grinding;
    (b) mixing the heated powder of step (a) with $Y_2O_3$ and $Al_2O_3$ to yield a mixture of from 66 to 93% by weight of silicon oxidized at the surface of the particles, from 5 to 24 % by weight of $Y_2O_3$ and from 2 to 9.6% by weight of $Al_2O_3$;
    (c) grinding the mixture of step (b) in a bail mill in the presence of an aqueous alkaline solution of pH 11–12 with addition of $Al_2O_3$ beads until a mean particle size of at most 5 $\mu$m has been reached.

17. The process of claim 16, wherein the grinding step (c) is carded out for 2.5 hours.

* * * * *